United States Patent [19]
Miller et al.

[11] 4,131,336
[45] Dec. 26, 1978

[54] PRIMARY REFLECTOR FOR SOLAR ENERGY COLLECTION SYSTEMS

[76] Inventors: Robert A. Frosch, Administrator of the National Aeronautics and Space Administration, with respect to an invention of Charles G. Miller, Pasadena; James B. Stephens, La Crescenta, both of Calif.

[21] Appl. No.: 906,297

[22] Filed: May 15, 1978

Related U.S. Application Data

[62] Division of Ser. No. 762,363, Jan. 25, 1977, which is a division of Ser. No. 598,969, Jul. 24, 1975, Pat. No. 4,065,053.

[51] Int. Cl.² .............................................. G02B 5/10
[52] U.S. Cl. .................................... 350/292; 126/271; 350/293; 350/320
[58] Field of Search ................ 126/270, 271; 350/211, 350/288, 292, 293, 294, 310, 320

[56] References Cited

U.S. PATENT DOCUMENTS

| | | | |
|---|---|---|---|
| 2,976,533 | 3/1961 | Salisbury | 126/270 X |
| 3,058,394 | 10/1962 | Edlin | 350/211 UX |
| 3,868,823 | 3/1975 | Russell, Jr. et al. | 126/270 X |
| 4,035,065 | 7/1977 | Fletcher et al. | 350/320 X |

OTHER PUBLICATIONS

Plisk, Xerox Disclosure Journal, vol. 1, No. 2, Feb. 1976, p. 101.

*Primary Examiner*—F. L. Evans
*Attorney, Agent, or Firm*—Monte. F. Mott; John R. Manning; Wilfred Grifka

[57] ABSTRACT

A fixed, linear, ground-based primary reflector having an extended curved sawtooth-contoured surface covered with a metalized polymeric reflecting material, reflects solar energy to a movably supported collector that is kept at the concentrated line focus of the reflector primary. The primary reflector may be constructed by a process utilizing well-known freeway paving machinery.

8 Claims, 5 Drawing Figures

PRIMARY REFLECTOR FOR SOLAR ENERGY COLLECTION SYSTEMS

ORIGIN OF THE INVENTION

The invention described herein was made in the performance of work under a NASA contract and is subject to the provisions of Section 305 of the National Aeronautics and Space Act of 1958, Public Law 84–568 (72 Stat. 435; 42 U.S.C. S2457).

CROSS-REFERENCE TO RELATED APPLICATIONS

This application is a division of Application Ser. No. 762,363, filed Jan. 25, 1977, which is in turn a division of application Ser. No. 598,969, filed July 24, 1975, now U.S. Pat. No. 4,065,053, for "Low Cost Solar Energy Collection System."

BACKGROUND OF THE INVENTION

The present invention relates generally to improvements in solar energy collection systems and more particularly pertains to new and improved primary reflectors for use in sun-tracking solar energy collection systems that are capable of producing high solar energy concentration ratios.

The overriding problem confronting developers of solar energy power systems has been the problem of producing the required high temperatures at a cost that would make the utilization of solar power competitively attractive. Presently, systems capable of producing the required high temperatures directly from solar energy, utilize tracking devices with large moving primary reflectors. Accurate tracking devices, however, are expensive to construct and costly to maintain if they are to track under conditions of weather extremes and varying high wind forces. The cost of producing large tracking reflectors and the costs of an associated tracking mechanism sturdy enough to withstand expected wind forces make a solar energy heat generating plant that can provide sufficient power to produce electricity in the multi-megawatt range an uneconomical prospect.

Solar energy collection systems that are to be used for producing superheated steam for use by steam-driven generator equipment for generating electric power must be capable of transforming solar energy into thermal energy in the range of 1000° F. or higher. The prior art systems capable of such heat generation involve tracking concentrators such as three-dimensional paraboloidal dishes which can be precisely steered in both altitude and azimuth to follow the sun's movement. In order to generate temperatures in the range of 1000° F. in sufficient quantity for use as energy for the generation of electrical power, literally thousands of 20-foot diameter, three-dimensional parabolic dishes must be utilized. The cost of producing large numbers of such optically finished compound-curve reflecting surfaces that are sturdy enough to hold their figure when tilted and turned in the wind is prohibitive.

OBJECTS AND SUMMARY OF THE INVENTION

An object of this invention is to provide a fixed, linear, ground-based primary reflector for use in a tracking solar energy collection system.

Another object of this invention is to provide a process for relatively inexpensively making a large linear fixed primary reflector for tracking solar energy collection systems.

These objects and the general purpose of this invention are accomplished in the following manner. A large fixed primary reflector is constructed at ground level by slip-forming in concrete or stabilized dirt a trough with a segmented one-dimensional circular cross-section profile. This profile is covered with an inexpensive light-reflective material. The axis of the primary reflector is optimally aligned with respect to the sun path in the area.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like-reference numerals designate like parts throughout the figures thereof and wherein.

DESCRIPTION OF THE PREFERRED EMBODIMENTS

Figure 1:
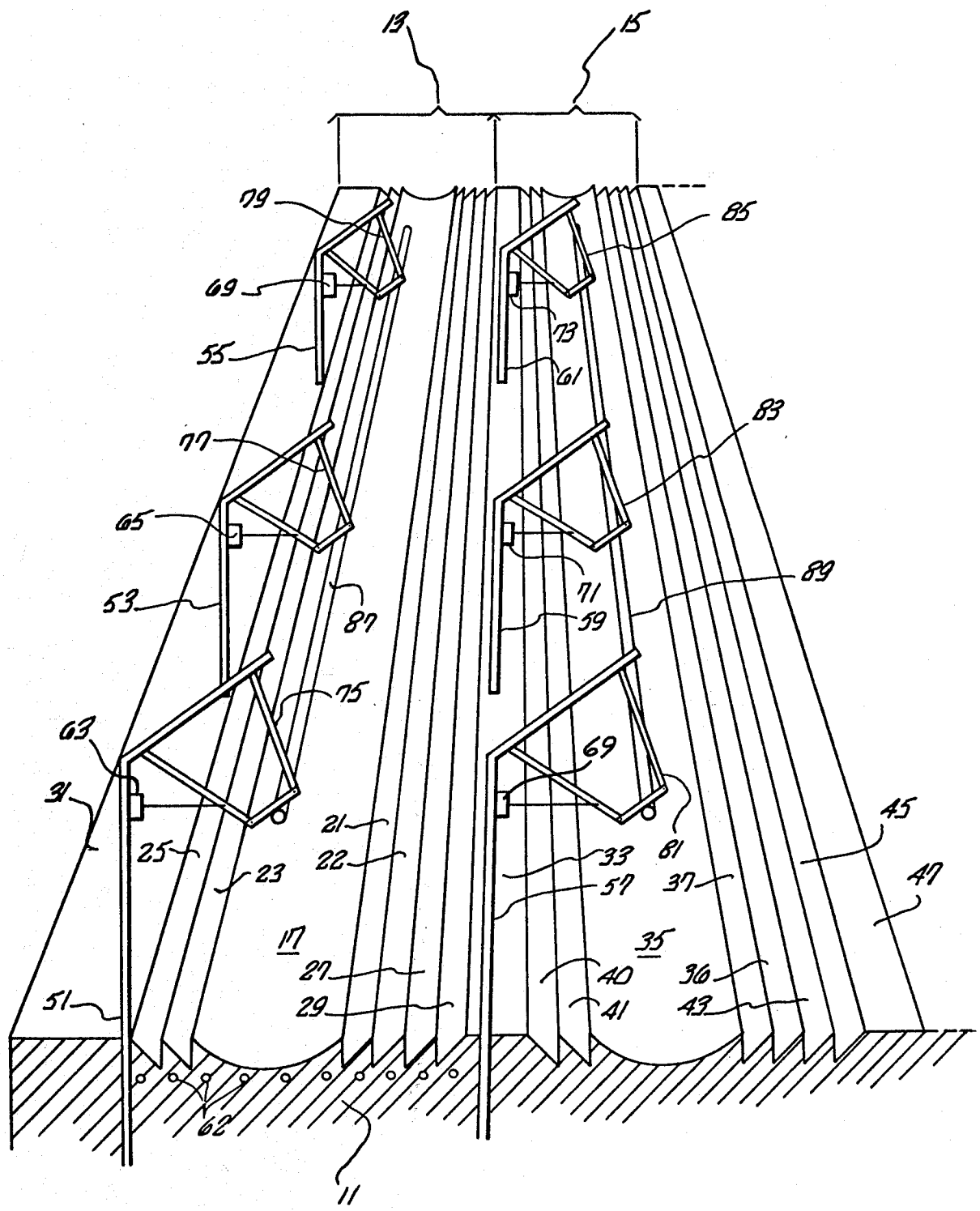
FIG. 1 is a perspective, partial section, illustrating a primary reflector according to the present invention used in a solar energy collection system.

One embodiment of a tracking solar energy collection system utilizing a primary reflector according to the present invention is illustrated in FIG. 1. The ground-based reflector 11 can be made up of a plurality of identical sections 13, 15, each section having its own fluid-carrying vessel 87, 89, respectively, for collecting the solar energy reflected from the respective modular surfaces of the sections 13, 15. The width of each modular surface is preferably within the capability of present day concrete road laying machinery.

The segments 25, 23, 17, 21, 22, 27 and 29, which make up the module reflector surface for section 13, can be laid by a process that utilizes standard highway construction or airstrip construction methods. The primary reflector modules may be formed as follows. A sifter mechanism mounted on wheels having a width equal to or slightly greater than the width of a primary reflector module is utilized. This sifter mechanism may have the following structure. A sifter body is divided into multiple segments, each segment utilizing a rotary screen-type mechanism for accepting a different particle size. Conveniently, four segments of the following particle grades may be used: rocks, coarse, medium and fine. The aggregate containing all these grades of particles is supplied to the sifter by a conveyor mechanism, the aggregate being inserted at the "fine" end of the sifter. The entire sifter mechanism moves in a direction whereby its coarse segments is always in the front. Consequently, the rocks or very large particles are laid down first, then the coarse particles, then the medium particles and then the fine particles.

This aggregate material may be the in-situ soil. Or, if the in-situ soil is unsuitable, suitable material may be brought in. As the aggregate is being delivered to the sifter, a binder material such as cement is mixed in with it. Consequently, all the various graded particles will be associated with the binder. As each graded particulate is ejected from the sifter, it is sprayed with water.

The moistened particulate of each graded layer is partially shaped to the desired contour of the primary reflector by a screed attached to the moving sifting mechanism for each. A plurality of pipes 62 in FIG. 2, having orifices therein, are preferably laid into the multi-layer substrate thus formed in the medium or fine layers.

The multi-layered substrate having binder material throughout is finished to the desired sawtooth segmented cross-section by a roller mechanism that preferably has the following structure: a roller having the inverse curvature of the desired profile and being the width of a primary reflector module. The roller travels along the graded aggregate substrate in front of a sled having the same contour as the roller. The sled has mounted thereon acoustic vibrators that operate at high frequency to provide a very smooth surface to the sawtooth segmented primary reflector. The depth of the various segmented steps with varying radii of curvatures 25, 23, 17, 21, 22, 27 and 29 is determined mainly by the slump factor of the thus stabilized soil during its curing process.

An aluminized Mylar sheeting material, 0.00025 inches thick, or an equivalent reflective material is laid over the slip-formed profile. The reflecting material is held down by a slight vacuum created at the surface of the reflector profile by drawing a vacuum on the pipes laid therein. Since concrete is a porous substance, drawing a vacuum on the pipes within the concrete will create a low pressure region at the surface of the concrete. This will hold the reflective film material in place without the necessity of glue or some other such fastening means. Holding the reflector covering in place by a vacuum also facilitates rapid replacement of torn or dirty reflector material. A vacuum level which varies in intensity suitable to the prevailing wind velocity is preferred. Any well-known vacuum-producing process may be utilized. However, an inexpensive method of producing the vacuum is preferred. One such method is commonly known as steam ejection, using the steam supplied by the system.

Each reflector module of the section, such as section 13, has a flat portion 31 which can provide access to the curved reflector segments for maintenance and inspection purposes, using a gantry-type vehicle. One type of support structure that may be used for each section to support the fluid-carrying vessel 87 comprises a plurality of stanchions 51, 53, 55, equidistantly spaced along a line parallel to the longitudinal axis of each reflector module of the reflector 11. The stanchions 51, 53, 55, for example, have a four-bar linkage 75, 77, 78, respectively, attached thereto which supports the fluid-bearing pipe 87. A hydraulic or electrical actuating device of well-known construction 63, 65, 67 is respectively located on the stanchions 51, 53, 55 for moving the four-bar linkages 75, 77, 79 in synchronism. This synchronous movement of the linkage causes the fluid-bearing pipe collector 87 to be transversely shifted in an area relative to the reflecting module 13. The movement of the pipe collector can be controlled either by a programmed source correlated to stored data relating to the apparent sun movement in the area, or alternatively, by sun-sensing and following systems similar to that used for attitude control on spacecraft.

Every other section of the reflector 11 is similarly constructed. Each section, such as section 15, for example, has a flat walkway portion 33 in which the plurality of stanchions 57, 59 and 61 are placed. These stanchions support respective four-bar linkages 81, 83 and 85. Each bar linkage supports a portion of the fluid-carrying pipe 89, which is moved transversely in an arc by actuation of motive means 69, 71 and 73, respectively connected to the bar-linkage devices. The cylindrical segments 40, 41, 35, 37, 36, 43 and 45 of the reflector module 15 may have the same radius of curvature as the segments 25, 23, 17, 21, 22, 27 and 29, respectively, of module 13.

These optimum width modules of the reflector surface 11 may be laid side by side in the manner illustrated in FIG. 1 for any desired distance. The length of each reflective module along the longitudinal axis may also be any length desired. It is envisioned that a reflector surface a mile square could be utilized in a solar energy collection system.

The height of the stanchions for each reflector module depends upon the radius of curvature of the troughs, as will be more fully explained hereinafter. The radius of curvature of the troughs depends upon the width of each module. The depth depends on the slump factor limitations of the stabilized soil or concrete used to form the primary reflector profile. This will also be more fully explained hereinafter.

It is well known in the art that a parabolic reflecting trough focuses received parallel light rays (that arrive in a direction such that a plane perpendicular to the directrix sheet contains the light rays in question) into a line focus along a line parallel to the vertex line and passing through the axis. If the received light rays, arriving parallel at a parabolic trough, arrive in such a direction that they make an angle with the above-mentioned plane perpendicular to the directrix sheet, the line focus suffers from coma and the focus becomes diffuse. It is for this reason that parabolic trough reflectors must be guided so that they always face the incoming sunlight squarely.

It is possible to achieve many of the results of the tracking parabolic trough with a non-tracking reflecting trough if the cross-section is made to be circular. Cylindrical reflecting surfaces of circular cross-section approximate the parallel line focusing action of an optimally positioned parabolic cylinder if only small segments of the circular cylinder surfaces are utilized. Incoming parallel light is brought to a substantial line focus for most angles of approach of the sunlight to the circular trough, albeit the location of the line focus varies with the angle of approach of the sunlight.

Figure 2:
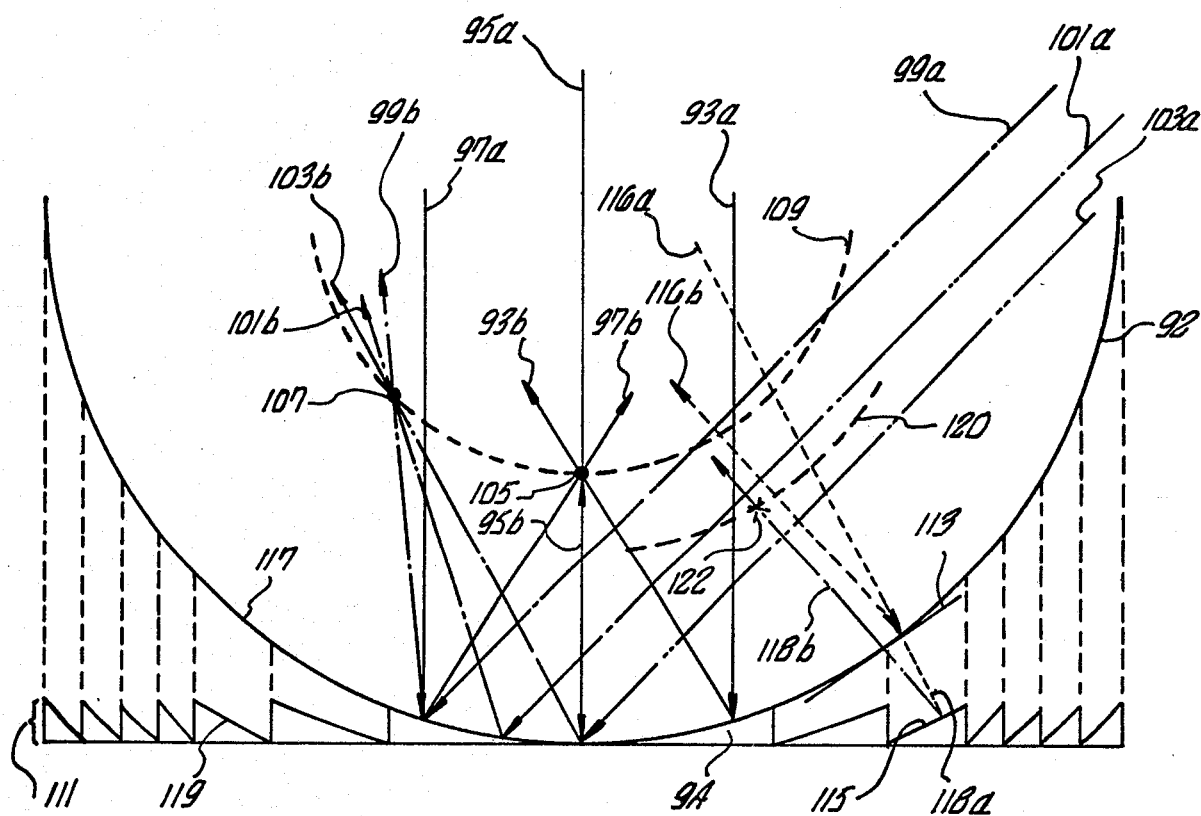
FIG. 2 is a diagrammatic illustration, useful in explaining the principle of the large-scale primary reflector of the present invention.

FIG. 2 illustrates a circular trough 92 receiving a plurality of differently angled parallel light beams. If only a small segment of the circular trough 92 is considered, such a segment 94, for example, parallel light rays 97A, 95A, 93A impinging upon the segment are reflected at the surface of the radius of curvature with an angle of incidence that equals the angle of reflection. As a consequence, rays 93A, 95A and 97A are reflected as rays 93B, 95B and 97B. These rays intersect at a point 105 lying on the focal surface 109. Rays 99A, 101A and 103A of the cylindrical segment 94 are reflected as rays 101B, 103B and 99B that intersect at a point 107 on the focal surface 109. Other skewed light rays, such as rays 116A, for example, would impinge upon the cylindrical surface 92 and be reflected in a direction 116B, and so on. The focal point 105 for parallel lines 95A, 97A and 93A, and the focal point 107 for parallel lines 101A, 103A and 99A turn into focal lines that run parallel to the longitudinal axis of the cylindrical trough when sheets of light rays parallel to 99A, 101A and 103A, but extending into and out of the paper are considered. The focal surface 109, therefore, becomes a cylindrical focal trough.

Because a shallow reflecting surface is desired from the standpoint of economy in construction and maintenance, the maximum height 111 to which any reflecting surface may peak should not exceed approximately 12 inches. This problem can be overcome by segmenting the cylindrical surface 92 into a sawtooth-like reflecting surface. Thus, for example, segment 119 is the segment 117 of the cylindrical surface 92 brought down to lie on a common plane with segment 94. Likewise, segment 115 is segment 113 of the cylindrical surface 92 brought down to lie on the same common plane. These segments all have a common height 111.

This segmented reflecting surface, however, will not function to focus parallel lines into a line focus on the surface of focal trough 109. Although the radius of curvature of the various segments is the same as the radius of curvature of the cylindrical trough 92, the distance from the center of curvature of the cylindrical trough 92 varies for each segment. As a consequence, ray 116A, for example, will be reflected from surface segment 115 along reflected light beam 118B. Light beam 116A travels an extra distance 118A before it strikes a reflecting surface 115. The focal point for all parallel light rays striking reflective surface 115 will lie at point 122, which is on a different focal surface of curvature 120 than the focal surface 109 of cylindrical surface 92. Each segmented radius of curvature such as 119, for example, may well have a different focal surface.

Figure 3:
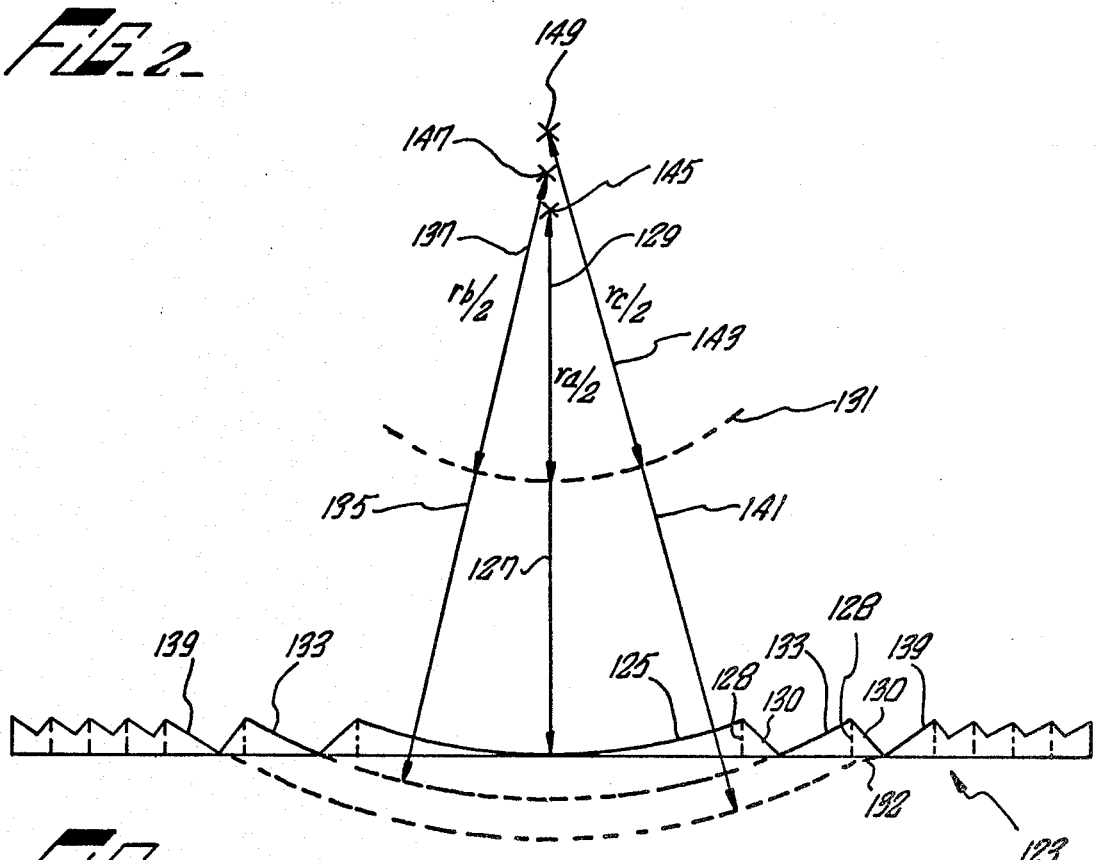
FIG. 3 is a diagrammatic illustration, useful in explaining the desired structure of the large-scale primary reflector of the present invention.

In order to provide a segmented one-dimensional linear reflecting element that is within the range of 4 to 12 inches in height, the radius of curvature of the various segments must be chosen so that no matter which segment of the equivalent flattened reflective surface 119, 94 and 115, for example, is impinged upon by parallel light rays, these light rays will intersect in the surface of a common focal surface. FIG. 3 illustrates how the radii of curvatures for the various segments of the reflector 123 is determined. The largest segment 125 of the reflecting profile 123 is chosen to have a radius of curvature ($r_a$) 127 that, for example, is 10 to 20 feet, this distance being a practical distance for the height of the stanchions. Conceivably, higher stanchions may be utilized. However, the cost of stanchions higher than 20 feet goes up considerably.

Figure 5:
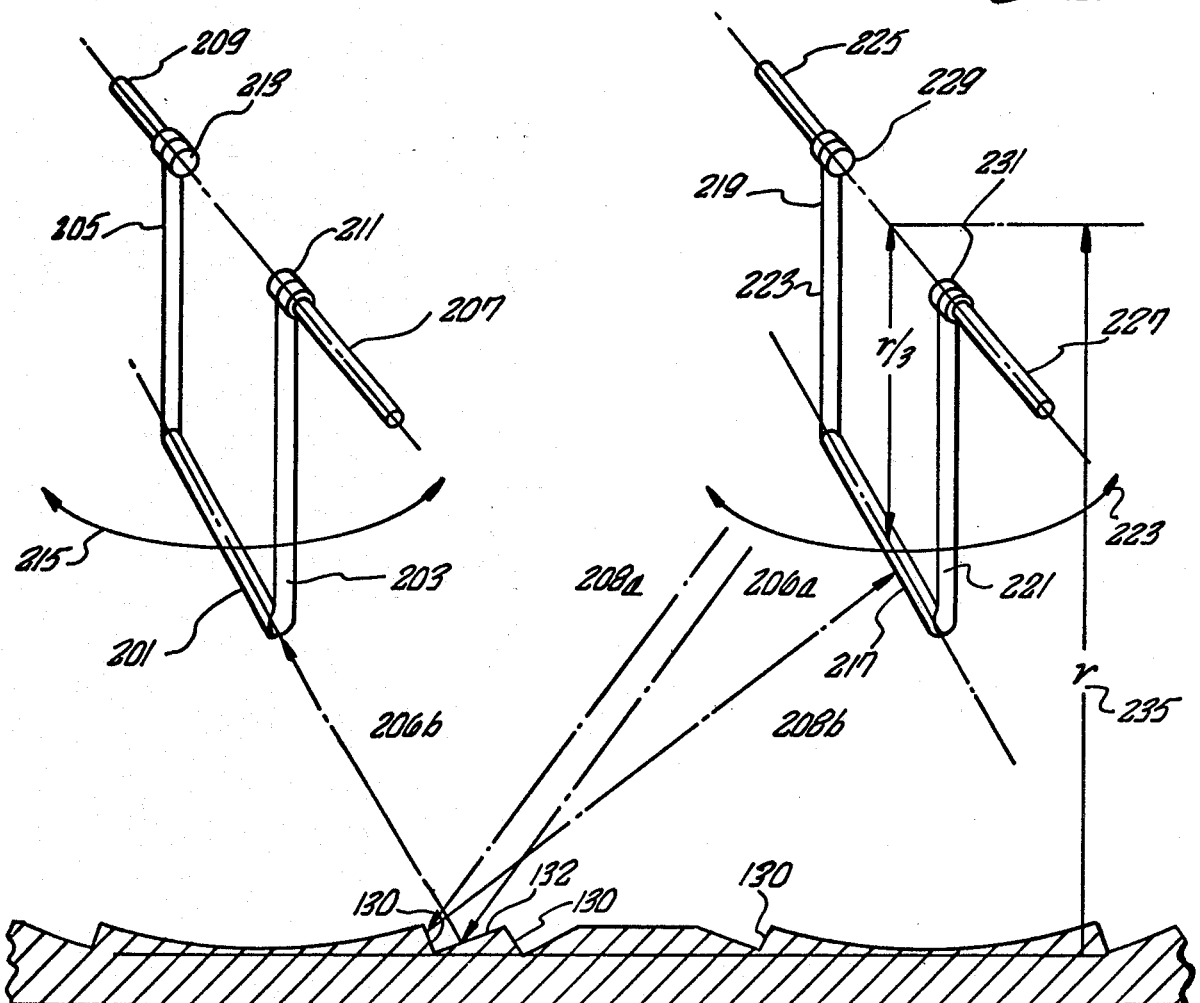
FIG. 5 is a partial perspective illustration of a type of laterally movable collector system that can be utilized with the large-scale primary reflector of the present invention.

Having determined the radius of curvature for the main segment from the cylindrical center of curvature 145 to be approximately 20 feet, the focal surface 131 is located 10 feet from the surface of segment 125. This focal surface distance is equal to half the radius of curvature ($\frac{1}{2}$)$r_a$. The radii of curvature of the other segments such as 133 and 139, for example, must then be chosen so that the distance from each surface to the chosen focal surface 131 is equal to half of its radius of curvature. Segments 133, as shown in FIG. 5, can be seen as having a radius of curvature 135, termed $r_b$ extending from a center of curvature 147.

The location of point 147 is chosen so that the distance from surface 133 to point 147 is twice the distance from surface 133 to the selected focal surface 131. For this reason, the focal surface of segments 133 will be located on a cylinder with its center at point 147 and having a radius ($\frac{1}{2}$)$r_b$. From the geometry, the focal surface of segments 133 will be almost exactly coincident with focal surface 131, the focal surface for segment 125. Therefore, an absorber pipe traveling along focal surface 131 and receiving reflected energy from segment 125 will, at the same location, receive energy reflected from segments 133.

In a similar fashion, segments 139 are given a radius of curvature $r_c$, extending from a point 149. The location of point 149 is chosen so that the distance from segment surface 139 to point 149 is twice the distance from segment surface 139 to the earlier-selected focal surface 131. Therefore, the focal surface of segments 139 will be located on a cylinder having its center at point 149 and a radius of ($\frac{1}{2}$)$r_c$. Thus, the focal surface of segments 139 will be almost exactly coincident with focal surface 131, the focal surface segments 126.

By choosing the radii of curvature of the various segments in the trough reflecting surface 123 in this manner, a reflecting surface that effectively functions like the deep trough 117 of FIG. 2, but is actually shaped as shown at 123 in FIG. 3, is obtained. The reflector-concentrator cross-sectional profile 123 illustrated in FIG. 3 can be slip-formed according to the process above described. Rather than slip-forming the reflector surface to have straight edges 128, sloping edges 130 at an obtuse angle are formed. The reason for interleaving the segments in this manner is that the area 132 within each valley between the imaginary straight edge 128 and the real sloped edge 130 is not effective as a reflecting surface because of shading by the upper corner of edge 128. As will be more fully explained hereinafter, by choosing the slope of edges 130 carefully, light rays striking those edges can be reflected to the line focus of an adajcent collector.

Figure 4:
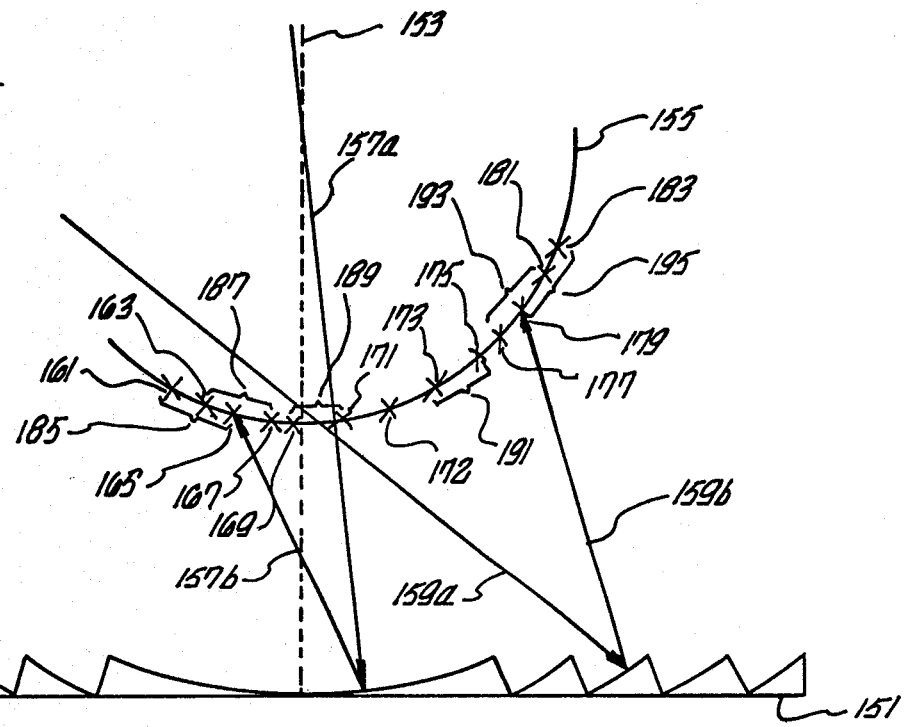
FIG. 4 is a diagrammatic illustration of the daily and seasonal adjustments required by a collector system utilizing the primary reflector of the present invention.

The orientation of the longitudinal axis of the segmented trough reflector surface will determine the extent of movement required by the collector pipe along the focal surface, in order to track the movement of the sun diurnally and seasonally. An east-west longitudinal axis orientation is the preferred orientation for the reason that a minimum of collector movement will be required. FIG. 4 illustrates the various positions that the collector must take during various times of the day and throughout the year, in order to be at the focal line of the solar energy reflected from the surface 151 at all times. The various segments of the reflector 151 have radii of curvature that will cause a substantial part of the parallel light impinging on most parts of the reflector surface to be reflected to a common point on arc 155.

The longitudinal axis of the reflecting surface 151 is assumed to be oriented in the east-west direction so that the troughs of the reflecting surface are parallel with the east-west direction. Broken line 153 represents the local vertical axis, shown here for purposes of reference. For an example relating to a location at latitude 34° N., a light ray 157A, at an angle of 11° to the local vertical, depicts the angle of incidence of solar energy impinging upon the reflector surface 151 at about 12 noon on June 21, i.e., the summer solstice. This light is reflected by surface 151 as a light beam 157B, and intersects the focal arc 155 at point 165. As the afternoon wears on, the angle with the local vertical increases, causing the reflected light beam 157B to move toward point 161 on the focal arc 155. At approximately 3:00 p.m., the reflected rays 157B are intersecting the focal arc 155 at point 161. At 9:00 a.m. that same day, the light rays 157A, impinging on surface 151, were reflected to cross the focal arc 155 at the same point 161. Thus, in the morning, these reflected rays will move from point 161 on the focal arc 155 towards point 165, and back toward point 161 in the afternoon.

The light ray 159A depicts the solar energy from a noontime sun on December 21. This energy is reflected by surface 151 as light rays 159B to intersect the focal arc 155 at point 179. At about 3:00 p.m., the reflected rays 159B are intersecting the focal arc 155 at point 183. At 9:00 a.m. of that same day, the rising sun causes the reflected beam 159B to intersect the focal arc 155 at point 183. Thus, the sun's movement causes the reflected rays to start at point 183, gradually move to point 179, at noon, reverse itself and go back to point 183.

Segment 193 of the focal arc 155 depicts the swing of the reflected sun's rays during the month of January. At about 9:00 a.m., the reflected light rays cross the focal arc at point 181. During the morning, they move toward point 177 where they cross at noontime. In the afternoon, they move back toward 181 where they cross at 3:00 p.m. Segment 191 of focal arc 155 depicts the movement of the reflected sun's rays during the month of February. Intersection 173 is the noontime intersection and intersection 195 being the ±3 hours from noon intersection point. Intersection point 172 of focal arc 155 represents the intersection of the reflected light rays during the month of March. There is minimal movement of the reflected light rays at the equinox date because the sun rises directly in the east and sets directly in the west on this data. The segment 189 of the focal radius 155 represents the movement required during the month of April, intersection point 171 being the noontime intersection point. Intersection point 169 is the ±3 hours from noon intersection point. Segment 187 of focal arc 155 is the movement required during the month of May, intersection point 167 being the noon time intersection point. Intersection point 163 is the ±3 hours from noon intersection point. As already noted, segment 185 of the focal arc 155 is the movement required for the month of June, intersection 165 being the noon intersection point and intersection point 161 being the ±3 hours from noon intersection point.

For the month of July, the reflected sun's rays again move along segment 187 of focal arc 155 as they did in May. In August, the reflected sun's rays move along segment 189 of focal arc 155 as they did in April. In September, the sun again rises directly in the east and sets directly in the west as it did in March. In October, the reflected sun's rays again traverse segment 191 of focal arc 155 as they did in February. In November, the reflected sun's rays again traverse segment 193 of focal arc 155 as they did in January.

In order to track the sun's movement diurnally and seasonally, the collector must traverse the focal arc 155 as the sun moves in the sky. As can be seen from FIG. 3, however, the movement of the collector during each day is quite small. Thus, for example, during December the collector need only move within segment 185. At the equinox dates of March and September, however, the collector pipe is substantially stationary at point 172. By not requiring large transversal movements on a daily basis, the drive mechanism for moving the collector pipe along the focal arc 155 is considerably simplified.

FIG. 5 illustrates one embodiment for suspending the high pressure steel, heat-absorbing, fluid-bearing collector pipes that are moved to always be at the focal line of the reflected sun's rays. The pipes 201, 217 preferably carry water or other fluid that is heated by the reflected solar energy from the reflecting surface 199. As was explained earlier, the fluid-bearing pipes 201 and 217 must move along the focal arcs 215, 233, respectively, in order to track the sun's movements.

There exists for every set of distance and size relationships between the modules that make up the solar reflector an obtuse angle for the edges 130 of the segments of the primary reflector 199 that is most effective in reflecting the incident light rays to an adjacent collector. For example, an incident light ray 206A hitting segment surface 132 is reflected as ray 206B to collector 201. Because of the obtuse angle of slope of edge 130, the entire surface 132 of that segment is an effective reflector. Light rays, such as ray 208A incident on edge surface 130, are reflected as rays 208B to the collector 217 for the adjacent module. Likewise, collector 201 will receive some light rays reflected from the edge surface 130 of its adjacent module.

One parallel line of stanchions would be required for each transversely movable collector pipe. The heat-absorbing pipe 201 is connected to a vertical intake pipe member 205 and a vertical outlet pipe member 203. Water (preferably treated or distilled in liquid, vapor, or steam form) is supplied to vertical pipe member 205 from pipe 209 through a high-pressure slip joint 213. Steam from the vertical pipe member 203 is supplied to pipe 207 through a high-pressure slip joint 211. The assembly, consisting of pipes 205, 201 and 203, can be seen to make up a trapeze that pivots at slip joints 213 and 211 to swing in the focal arc 215. The intake pipe 209 and outlet pipe 207 are, of course, connected to a utilization device (not shown) by standard, well-known valving techniques which includes pressurizing and pressure-relief devices, matched to the system operating pressure. Such systems being well within the purview of a person of skill in the art, they are not further disclosed herein. In order for the pipe 201 to swing along this focal arc 215, the distance from the slip joints to the pipe must be equal to half the focal radius of the basic segment in the reflector surface 199.

As was illustrated in FIG. 1, another parallel line of stanchions may support another fluid-bearing pipe member 217 suspended to swing along the focal arc 233. The vertical inlet pipe 291, the vertical outlet pipe 221 and the heat-absorbing pipe 217 again forms a trapeze that swings about the slip joints 229 and 231 that connect the inlet pipe 225 and the outlet pipe 227 to the trapeze assembly. The length of the heat-absorbing pipe assembly is determined by the length of each modular section of the primary reflection surface. The number of heat-absorbing pipes utilized is determined by the number of modules forming the entire primary reflecting surface.

Many modifications and variations of the present invention are possible in light of the above teachings. It is to be understood, therefore, that within the scope of the appended claims, the invention may be practiced otherwise than as specifically described.

What is claimed is:

1. A large primary solar reflector for use with a solar energy collection system, comprising:

a porous supporting structure having a linear sawtooth-like profile;

pipes having small orifices therein embedded in said supporting structure; and a reflective material overlaying said supporting structure and being held to the surface thereof by a negative pressure at the surface created by drawing a vacuum on said pipes.

2. The primary reflector of claim 1 wherein said porous supporting structure comprises a long ribbon of concrete formed to the desired profile.

3. The primary reflector of claim 1 wherein said porous supporting structure comprises a long ribbon of sifted and binder-stabilized soil formed to the desired profile.

4. The primary reflector of claim 1 wherein said reflective material comprises a flexible sheet of reflective material.

5. The primary reflector of claim 1 wherein said reflective material comprises a sheet of aluminized Mylar.

6. The primary reflector of claim 1 wherein said linear sawtooth-like profile comprises a plurality of cylindrical segments taken lengthwise from a cylinder having a diameter that is equal to the width of the primary reflector, said cylindrical segments being located side by side on a common plane.

7. The primary reflector of claim 6 wherein said linear sawtooth-like profile is located at ground level.

8. The primary reflector of claim 1 further comprising a plurality of linear sawtooth-like supporting structures located side by side on a common plane with a flat surface connecting each supporting structure to its adjacent supporting structure.

* * * * *